United States Patent
Amulothu et al.

(10) Patent No.: US 9,882,779 B2
(45) Date of Patent: Jan. 30, 2018

(54) SOFTWARE VERSION MAINTENANCE IN A SOFTWARE DEFINED NETWORK

(71) Applicant: International Business Machines Corporation, Armonk, NY (US)

(72) Inventors: Venkata siva N. Amulothu, Cary, NC (US); Nitin Kumar J. Huralikuppi, Santa Clara, CA (US); Ashish Kapur, Santa Clara, CA (US); Vishal Shukla, San Jose, CA (US); Saritha Yeddula, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 14/661,321

(22) Filed: Mar. 18, 2015

(65) Prior Publication Data
US 2016/0277234 A1   Sep. 22, 2016

(51) Int. Cl.
*H04L 12/24* (2006.01)

(52) U.S. Cl.
CPC ........ *H04L 41/082* (2013.01); *H04L 41/0859* (2013.01)

(58) Field of Classification Search
None
See application file for complete search history.

(56) References Cited

U.S. PATENT DOCUMENTS

| | | | |
|---|---|---|---|
| 6,397,385 B1 | 5/2002 | Kravitz | |
| 6,950,878 B2 | 9/2005 | Kwok et al. | |
| 2008/0109800 A1* | 5/2008 | Takahashi | G06F 8/65 717/170 |
| 2013/0064066 A1* | 3/2013 | Ghosh | H04L 41/082 370/216 |
| 2014/0212135 A1 | 7/2014 | Ji et al. | |
| 2014/0280433 A1 | 9/2014 | Messerli et al. | |
| 2014/0310388 A1 | 10/2014 | Djukic et al. | |
| 2014/0325038 A1 | 10/2014 | Kis | |
| 2015/0312091 A1* | 10/2015 | Yang | H04L 41/0668 370/221 |

OTHER PUBLICATIONS

Bigswitch Networks, "Switch Light", Jul. 2013, pp. 1-3, Copyright 2013 Big Switch Neworks, Inc., <http://www.bigswitch.com/sites/default/files/sdnresources/switchlightdatasheet.pdf>.

* cited by examiner

*Primary Examiner* — Gregory Sefcheck
*Assistant Examiner* — Jenkey Van
(74) *Attorney, Agent, or Firm* — James H. Mayfield (57) ABSTRACT

As disclosed herein a method includes a software defined networking controller identifying an element managed by the controller on which to perform a software version maintenance operation, de-activating the identified element in a software defined network (SDN), ensuring that there is an active backup for the element in the SDN while the identified element is de-activated, initiating the software version maintenance operation on the de-activated identified element, and in response to completion of the software version maintenance operation, re-activating the de-activated identified element in the SDN. A computer system, and a computer program product corresponding to the method are also disclosed herein.

17 Claims, 4 Drawing Sheets

SOFTWARE VERSION MAINTENANCE IN A SOFTWARE DEFINED NETWORK

TECHNICAL FIELD

The present invention relates generally to the field of software version maintenance, and more particularly to maintenance of software versions on elements in a software-defined network (SDN).

BACKGROUND

A software-defined data center (SDDC) is a data center where information technology infrastructure is virtualized and delivered as a service. The SDDC may be fully controlled by software, meaning that the hardware configuration of each element of the SDDC is accomplished through a common software system. This is in contrast to traditional data centers where hardware devices that define the infrastructure are individually configured.

An SDDC may include an SDN overlay (hereafter interchangeably "SDN" or "overlay"). An SDN is a logical network formed and operated using logical representations of underlying physical networking components. The physical networking components are abstracted into corresponding logical or virtual representations, and the abstractions are used to define the SDN. As an example, a logical representation of a hypervisor can participate in an SDN, such that a function attributed to the logical representation of the hypervisor in the SDN is actually performed by the underlying hypervisor component in the underlay. Similarly, a logical representation of a networking gateway can participate in an SDN, such that a function attributed to the logical representation of the networking gateway in the SDN is actually performed by the underlying networking gateway component in the physical network, also called an underlay.

In an SDN, because the actual networking components that perform the networking functions are abstracted into logical entities representing the networking functionality offered by those components and not the actual implementations of those functionalities, something is needed to direct those networking functionalities into a functioning logical network. That direction is performed by an SDN controller. SDN controllers are based on protocols, such as OpenFlow, that allow servers to tell switches where to send packets.

SUMMARY

As disclosed herein a method for enabling software version maintenance in a software defined network includes a software defined networking controller identifying an element managed by the controller on which to perform a software version maintenance operation. The method further includes de-activating the identified element in a software defined network (SDN). The method further includes ensuring that there is an active backup for the element in the SDN while the identified element is de-activated. The method further includes initiating the software version maintenance operation on the de-activated identified element. The method further includes re-activating the de-activated identified element in the SDN in response to completion of the software version maintenance operation.

As disclosed herein a computer program product for enabling software version maintenance in a software defined network. The computer program product includes one or more computer readable storage media and program instructions stored on the one or more computer readable storage media. The program instructions include instructions to identify, by a software defined networking controller, an element managed by the controller on which to perform a software version maintenance operation. The program instructions further include instructions to de-activate the identified element in a software defined network (SDN). The program instructions further include instructions to ensure that there is an active backup for the element in the SDN while the identified element is de-activated. The program instructions further include instructions to initiate the software version maintenance operation on the de-activated identified element. The program instructions further include instructions to re-activate the de-activated identified element in the SDN in response to completion of the software version maintenance operation.

As disclosed herein a computer system for enabling software version maintenance in a software defined network. The computer system includes one or more computer processors, one or more computer readable storage media, and program instructions stored on the one or more computer readable storage media for execution by at least one of the one or more processors. The program instructions include instructions to identify, by a software defined networking controller, an element managed by the controller on which to perform a software version maintenance operation. The program instructions further include instructions to de-activate the identified element in a software defined network (SDN). The program instructions further include instructions to ensure that there is an active backup for the element in the SDN while the identified element is de-activated.

DETAILED DESCRIPTION

In an SDDC, many of the elements (e.g., network devices, software switches, routers, VPNs, and firewalls) are managed and controlled by an SDN controller. An SDDC may have a large number of elements providing services to thousands of customers, each expecting 100% availability. In an SDDC, there is a challenge to perform software version maintenance (e.g., upgrade software versions) on the elements while avoiding downtime to customers who are using services provided by the elements of the SDDC. In an SDDC, there may be similar elements, controlled by the SDN controller, running on versions of software (e.g., previous versions) that are in need of maintenance. Currently, to resolve the issue of determining which elements need software version maintenance, each individual element must be evaluated to verify the currently installed software version and each element containing, for example, outdated software must be manually updated. It has been observed that manually verifying and performing software version maintenance on each element may lead to significant downtime and loss of revenue. The embodiments disclosed herein generally address and solve the above-described problems.

Figure 1:
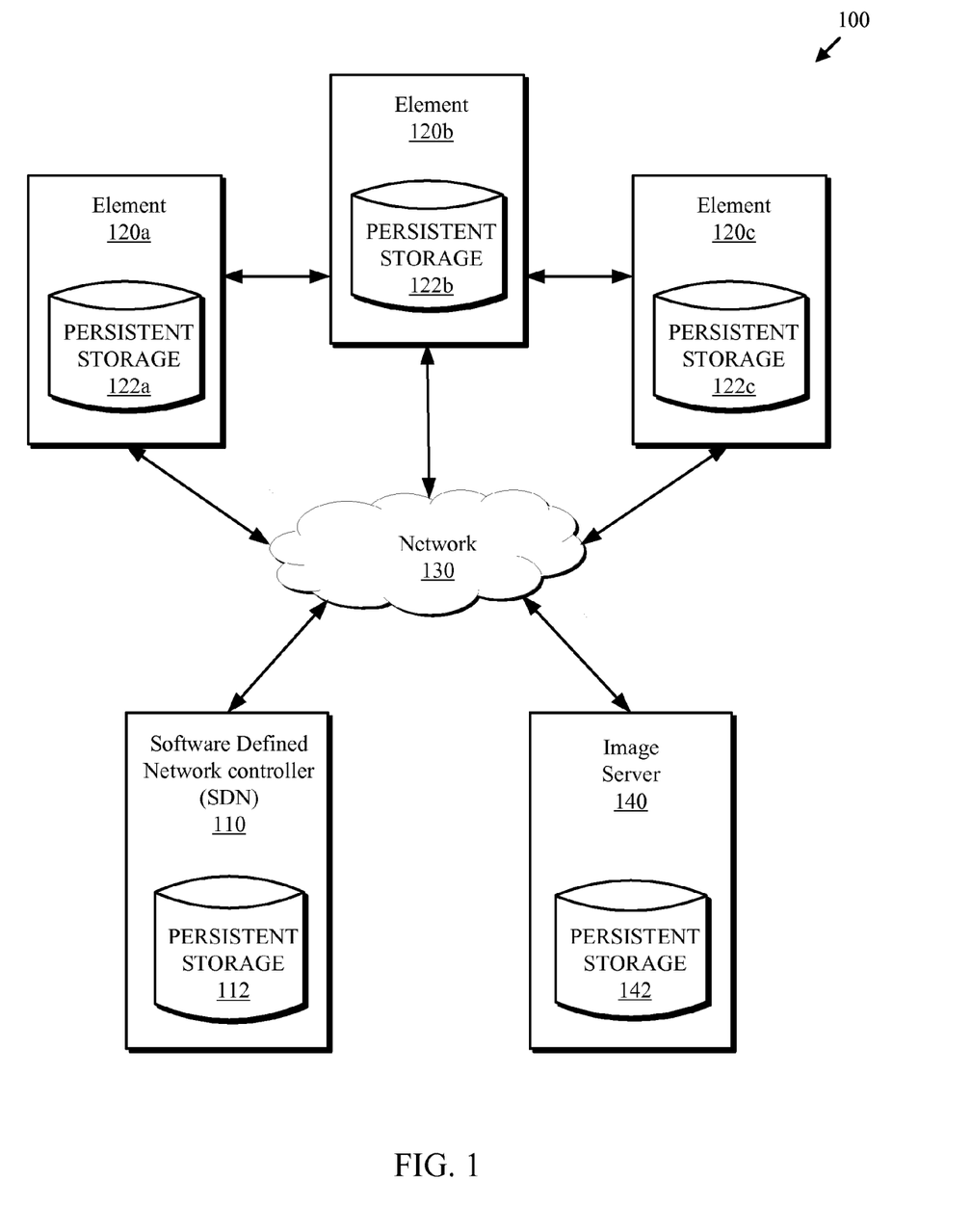
FIG. 1 is a functional block diagram of one embodiment of a distributed data processing environment in which at least some of the embodiments disclosed herein may be deployed.

FIG. 1 is a functional block diagram of one embodiment of a distributed data processing environment in which at least some of the embodiments disclosed herein may be deployed. As depicted, a distributed data processing environment 100 includes an SDN controller 110, one or more elements 120 (e.g., elements 120a, 120b, and 120c), a network 130, and an image server 140. Distributed data processing environment 100 is one example of an environment in which at least some of the embodiments disclosed herein may be deployed.

SDN controller 110 processes data provided by, or retrieved from, elements 120. Elements 120 may be accessible to SDN controller 110 via network 130. Image server 140 may also be connected to SDN controller 110 and elements 120 via network 130. In some embodiments, one or more of elements 120 may also function as image server 140.

Figure 4:
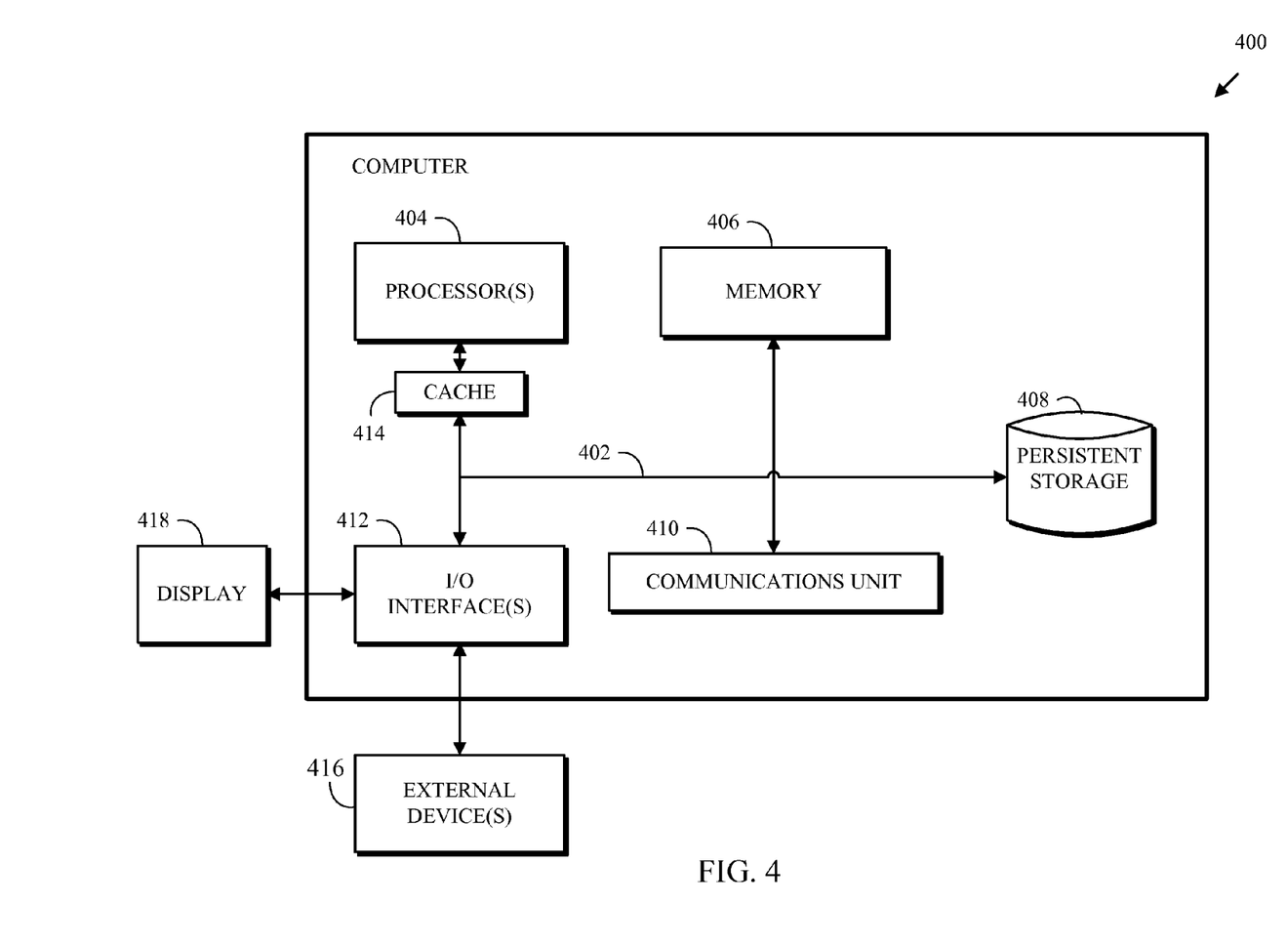
FIG. 4 is a block diagram depicting various components of one embodiment of a computer suitable for executing the methods disclosed herein.

Alternatively, an SDN controller could be entirely a software implementation that runs on a device having the internal and external hardware components of FIG. 4. Furthermore, network 130 can be any combination of connections and protocols that will support communications between SDN controller 110, elements 120, image server 140, and other devices (not shown) within distributed data processing environment 100. For example, network 130 can be a local area network (LAN), a wide area network (WAN) such as the Internet, or a combination of the two, and can include wired, wireless, or fiber optic connections.

As depicted, SDN controller 110, elements 120, and image server 140 each have persistent storage 112, 122, and 142, respectively. Each of persistent storage 112, 122, and 142 can be, for example, a magnetic hard drive, solid state drive, storage area network (SAN), network attached storage (NAS), or cloud storage. Image server 140 may be a server capable of receiving and storing, on persistent storage 142, software installation images from other devices (not shown) within distributed data processing environment 100. Persistent storage 122 (i.e., 122a, 122b, and 122c) of elements 120 may include software loaded and installed from image server 140 over network 130. Persistent storage 112 of SDN controller 110 may include information vital to maintaining and managing the SDDC within distributed data processing environment 100. In some situations, element 120a requires a previous version of software to be upgraded to a newer version, and SDN controller 110 enables image server 140 to provide and install the required software version on element 120a. In some embodiments, SDN controller 110 enables image server 140 to restore element 120b by re-installing a previous version of the software on element 120b.

Figure 2:
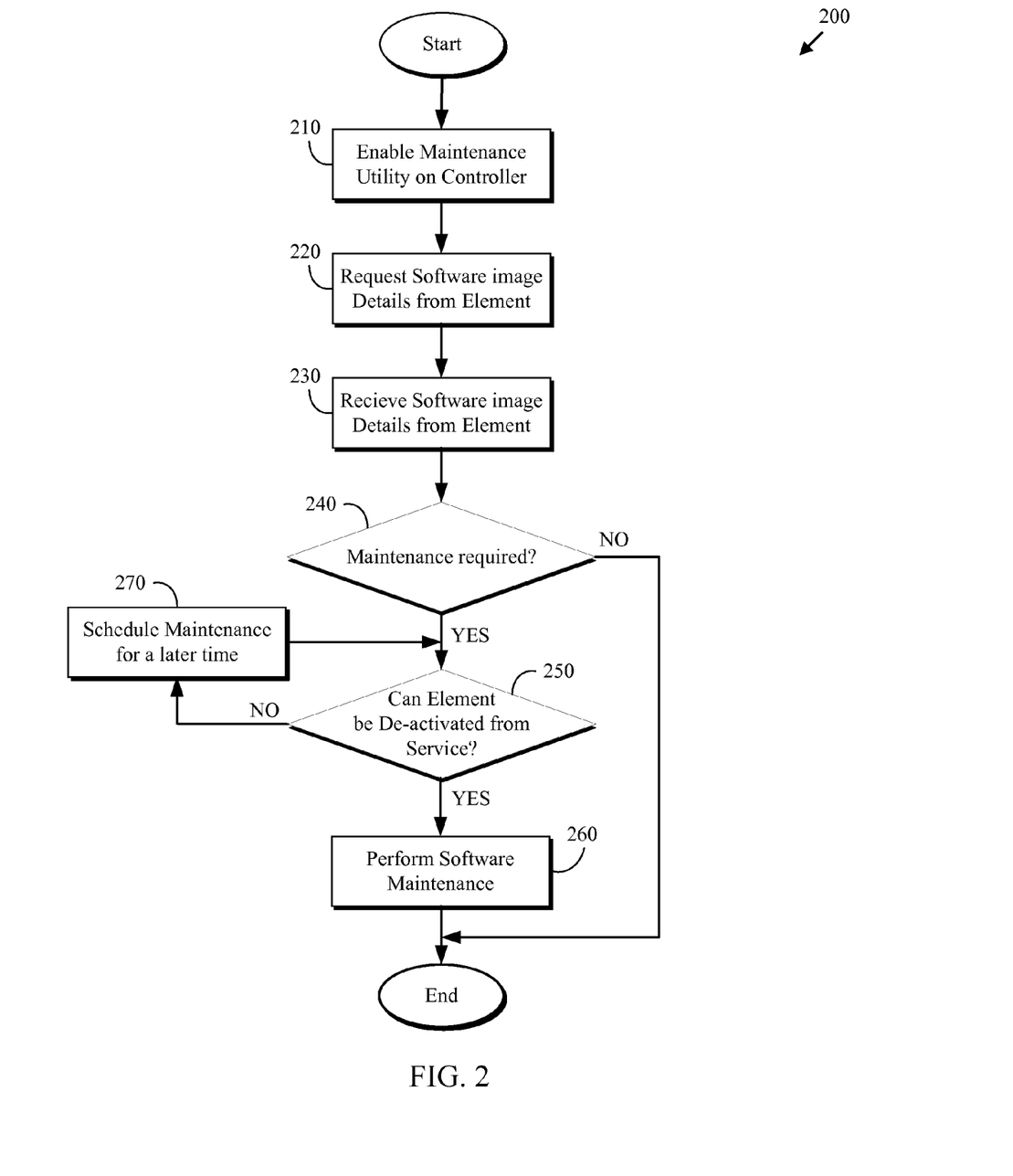
FIG. 2 is a flow chart depicting a method for determining whether software version maintenance is required, in accordance with an embodiment of the present invention.

FIG. 2 is a flow chart depicting a method for determining whether software version maintenance is required, in accordance with an embodiment of the present invention. As depicted, method 200 includes enabling (210) a software version maintenance utility, requesting (220) software image details, receiving (230) software image details, determining (240) whether software version maintenance is required, determining (250) whether an element can be de-activated, performing (260) software version maintenance, and scheduling (270) the software version maintenance for a later time. Method 200 enables SDN controller 110 to determine if an element controlled by SDN controller 110 requires software version maintenance.

Enabling (210) the software version maintenance utility may include enabling, on SDN controller 110, a utility that is able to communicate with elements under the control of SDN controller 110. Enabling the software version maintenance utility may enable SDN controller 110 to manage and perform software version maintenance for one or more elements controlled by SDN controller 110. In some embodiments, checking the currently installed software version on an element, also called an image check, occurs in response to the element being powered up, or becoming available on the SDN. In other embodiments, an image check occurs in response to SDN controller 110 powering up. In another embodiment, an image check occurs according to a user-defined schedule configured in SDN controller 110.

Requesting (220) software image details may include SDN controller 110 sending a vendor packet to an element, such as element 120a. In some embodiments, the vendor packet requests the element to identify itself (e.g., the type of element) and also identify the version of a specific software installed on the element. In other embodiments, the vendor packet requests information regarding the identity of the element (e.g., the type of element) and also the version of all software installed on the element.

Receiving (230) software image details may include SDN controller 110 receiving, from an element, such as element 120a, a response to a vendor packet request. The response may contain information identifying the element type (e.g., network switch, router, VPN, firewall, hypervisor, agent, appliance, load balancer), as well as providing information corresponding to installed software. In some embodiments, the response is a vendor packet updated with element type and software image version for a specific software installation. In other embodiments, the response is a vendor packet updated with element type and software image details for all installed software on the element.

Determining (240) whether software version maintenance is required may include SDN controller 110 parsing through a received vendor packet to determine if the element type identified in the packet is one that is able to be subject to software version maintenance. An image server, such as image server 140, may not be configured to maintain the element type identified in the vendor packet, and therefore the software version of the element is unable to be maintained by the SDN. Additionally, if the element type is one that can be subject to software version maintenance, then SDN controller 110 may examine the current version of software image identified in the vendor packet information (i.e., the currently installed software version) and determine if any software version maintenance is required. Software version maintenance may be required if the version of the currently installed software does not match a required software version. For example, if the required software version is more recent than the version of the currently installed software, the required software version maintenance may be a software upgrade from the version of the currently installed software to the required software version. In some embodiments, SDN controller 110 verifies the currently installed software version against a catalog (e.g., master list) of required software versions maintained by SDN controller 110. In other embodiments, SDN controller 110 verifies the currently installed software version against a database of required software versions. If software version maintenance is required, then method 200 proceeds to determining operation 250. Otherwise, method 200 is complete and terminates.

Determining (250) whether the element, such as element 120a, can be de-activated may include SDN controller 110 determining if the element can be removed from service without adversely affecting availability of the services being provided by the SDDC. In some embodiments, a networking element, such as network switch, can be de-activated if an alternate or backup path devoid of the networking element is available, enabling removal of the networking element from a shortest path list of an SDN topology. In other embodiments, a server element, such as a hypervisor, is able to be de-activated if a backup server (e.g., a replacement server) exists to function in place of the de-activated server element. If the element can be de-activated, then method 200 proceeds to performing (260) maintenance. Otherwise, the method 200 proceeds to scheduling (270) the software version maintenance.

Performing (260) software version maintenance may include SDN controller 110 de-activating the element that requires the software version maintenance. Additionally, a software maintenance entity, also referred to as an image server, may be used to obtain and apply the software image to the element during the software version maintenance. The software version maintenance operation will be described in greater detail in the description of FIG. 3.

Scheduling (270) the software version maintenance for a later time may include SDN controller 110 using a scheduling program to schedule, for some future date, the software version maintenance for an element that is currently unable to be subject to software version maintenance. In some embodiments, SDN controller 110 selects an arbitrary date and time to schedule the next upgrade attempt. In other embodiments, SDN controller 110 uses historical details corresponding to the element to be subject to software version maintenance to schedule the next maintenance attempt at a time that is historically optimal for the maintenance to be performed. In another embodiment, SDN controller 110 selects a previously defined date and time to schedule the next maintenance attempt.

Figure 3:
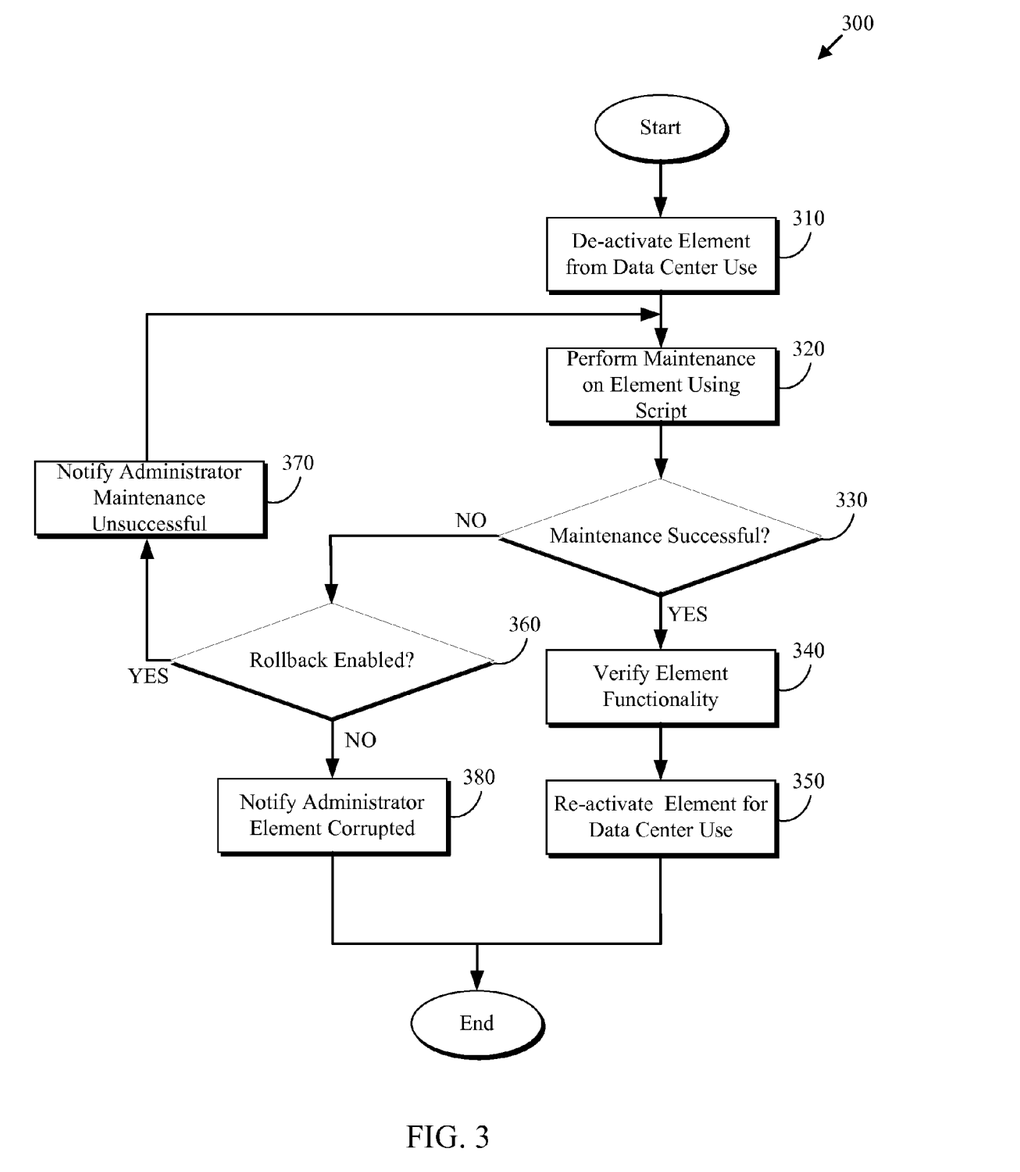
FIG. 3 is a flow chart depicting a software version maintenance method, in accordance with an embodiment of the present invention.

FIG. 3 is a flow chart depicting a software version maintenance method, in accordance with an embodiment of the present invention. As depicted, method 300 includes de-activating (310) an element, performing software version maintenance (320) on the element, determining (330) whether the maintenance was successful, verifying (340) element functionality, re-activating (350) the element, determining (360) whether rollback is enabled, notifying (370) an administrator that the maintenance is unsuccessful, and notifying (380) an administrator that the element is corrupted. Method 300 enables automatic software version maintenance on an element without end users experiencing any system down-time.

De-activating (310) an element, such as element 120a, may include SDN controller 110 removing the element from availability within the SDDC, causing the element to be de-activated. Prior to removing the element from availability, SDN controller 110 may ensure that an alternate means of providing the service of the removed element is available, so that no outages or down time will be experienced by users of the SDDC. In some embodiments, the element to be de-activated is a networking element (e.g., a network switch), and SDN controller 110 confirms that removing the network switch will not cause network outages, SDN controller 110 ensures no flows exist on the network switch, and SDN controller 110 removes the network switch from the topology access list. In other embodiments, the element to be de-activated is a server element, and SDN controller 110 confirms a backup server is available to provide the functionality of the server element to be de-activated, SDN controller 110 creates a replica snapshot of the state information from the server element to be de-activated (placing the snapshot on the backup server and enabling any active processes on the server element to be de-activated to continue processing on the backup server), and SDN controller 110 removes the server element from network 130.

Performing software version maintenance (320) on the element may include SDN controller 110 contacting image server 140 to initiate software version maintenance on an element, such as element 120a, that may have been de-activated by de-activation operation 310. In one embodiment, the communication between SDN controller 110 and image server 140 is via REST APIs. The communication between SDN controller 110 and image server 140 may include information identifying the element to be upgraded and the software image to be used for the maintenance (e.g., the software name and version may be included). The image server may transmit the required software image to the target element using methods familiar to those in the art, such as, but not limited to, SSH, Telnet, and FTP.

The maintenance operation 320 may be managed using an automated script that resides and executes on image server 140. In some embodiments, the automated script initiates the software installation on the target element. In other embodiments, the automated script enables processes on the target element that monitor the completion status of the installation operation. In response to completion of the software installation, the completion status of the maintenance may be transmitted to SDN controller 110. In one embodiment, the completion status is transmitted from the target element to SDN controller 110 via REST APIs. In another embodiment, the completion status is transmitted from image server 140 to SDN controller 110 via REST APIs.

Determining (330) whether the software version maintenance was successful may include receiving a completion code from a maintenance operation (e.g., maintenance operation 320). If the completion code indicates a successful completion of the software version maintenance, then method 300 proceeds to verify element functionality 340. Otherwise, method 300 proceed with determination operation 360.

Verifying (340) element functionality may include SDN controller 110 executing automated regression tests on an element that has had a successful software version maintenance operation, for example, a successful software upgrade. In some embodiments, there are unique automated regression tests corresponding to each element type managed by SDN controller 110, and the regression tests are executed on the element to verify the element is functioning correctly. In other embodiments, the regression tests are generic tests to verify the element can successfully connect to network 130, and communicate on network 130. If an element fails a functionality test, the element will not be re-activated, and the system administrator will be notified of the functionality error.

Re-activating (350) an element may include SDN controller 110 making the element available within the SDDC, causing the element to be re-activated. In some embodiments, the element to be re-activated is an updated networking element (e.g., a network switch), and SDN controller 110 adds the updated network switch to the topology access list and installs one or more flows onto the networking element, resulting in the updated network switch being available for network traffic. In other embodiments, the element to be re-activated is an updated server element, and SDN controller 110 creates a replica snapshot of the state information from the backup server element (placing the snapshot on the updated server element, enabling any active processes on the backup server to continue processing on the updated server element), and SDN controller 110 adds the server element to network 130. Once the updated server element is active, the backup server element may be de-activated.

Determining (360) whether rollback is enabled may include checking a configuration setting on SDN controller 110. Rollback may provide the ability to restore an element to a previous software version to recover from an error situation. In one embodiment, if rollback is enabled, the configuration includes information identifying the original software version in use prior to the failed maintenance attempt. If rollback is enabled, then method 300 proceeds to notify an administrator operation 370. Otherwise, method 300 proceeds to notify administrator operation 380.

Notifying (370) an administrator that the software version maintenance was unsuccessful may include preparing an error notification corresponding to the maintenance failure, including information required to identify the element in error. In one embodiment, the error notification of a maintenance failure includes information identifying the failure date, target element, the failed software image, the error code generated during the maintenance operation, and the rollback image. In another embodiment, the error notification of a maintenance failure includes a reference to log files and error reports that were generated as a result of the failure. In some embodiments, the error notification of a maintenance failure is provided to the administrator in the form of an email. In other embodiments, the error notification is provided to the administrator as an alert on a system administrator computer console.

Notifying (380) an administrator the element is corrupted may include preparing an error notification of element corruption including information required to identify element in error. In one embodiment, the error notification of element corruption includes information identifying the failure date, target element, the failed software image, and the error code generated during the maintenance operation. In another embodiment, the error notification of element corruption includes a reference to log files and error reports that were generated as a result of the failure. In some embodiments, the error notification is provided to the administrator in the form of an email. In other embodiments, the error notification is provided to the administrator as an alert on a system administrator computer console.

FIG. 4 depicts a block diagram of components of a computer system 400, which is an example of a system such as SDN controller 110 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Computer system 400 includes processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., persistent storage 112, method 200 and method 300, are stored in persistent storage 408 for execution and/or access by one or more of the respective processor(s) 404 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of SDN controller 110. In these examples, communications unit 410 includes one or more network interface cards. Communications unit 410 may provide communications through the use of either or both physical and wireless communications links. Program instructions and data used to practice embodiments of persistent storage 112, method 200 and method 300 may be downloaded to persistent storage 408 through communications unit 410.

I/O interface(s) 412 allows for input and output of data with other devices that may be connected to each computer system. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method comprising:
a software defined networking controller (SDN controller) identifying an element managed by the SDN controller on which to perform a software version maintenance operation, the element in a software defined network (SDN), wherein identifying the element comprises:

responsive to the SDN controller determining that the element has powered up, sending a vendor packet from the SDN controller to the element;

receiving a reply to the vendor packet from the element, the reply identifying a version of a software image installed on the element, the reply identifying an element type for the element selected from a list consisting of a network switch, a router, a VPN, a firewall, a hypervisor, an agent, and appliance, and a load balancer;

determining, using the SDN controller, that the version identified in the reply does not match a required version of the software image identified in a catalog maintained by the SDN controller;

ensuring, using the SDN controller, that there is an active backup for the element in the SDN;

responsive to ensuring that there is an active backup for the element, de-activating, using the SDN controller, the element;

initiating the software version maintenance operation on the element; and in response to completion of the software version maintenance operation, re-activating, using the SDN controller, the element in the SDN.

2. The method of claim 1, wherein the software version maintenance operation comprises upgrading a version of a software image installed on the element to a more recent version of the software image.

3. The method of claim 1, wherein said sending occurs in response to the SDN controller becoming active in the SDN.

4. The method of claim 1, wherein said sending occurs according to a user-defined schedule accessible to the SDN controller.

5. The method of claim 1, wherein the element comprises a networking element, and wherein said de-activating comprises:

ensuring that the networking element is removed from a shortest path of an SDN topology; and ensuring that no flows exist on the networking element.

6. The method of claim 1, wherein the element comprises a networking element, and wherein the active backup comprises an alternate path devoid of the networking element in an SDN topology.

7. The method of claim 1, wherein the element comprises a networking element, and wherein said re-activating comprises installing one or more flows onto the networking element.

8. The method of claim 1, further comprising:

before said re-activating, performing a regression test on the element, wherein the regression test verifies that the software version maintenance operation was successful.

9. The method of claim 1, further comprising:

before said reactivating, performing a regression test on the element, wherein the regression test verifies that the software version maintenance operation was successful, and wherein the regression test is specific to the element type of the element.

10. A computer program product comprising:

one or more computer readable storage media and program instructions stored on the one or more computer readable storage media, the program instructions comprising instructions to:

identify, by a software defined networking controller (SDN controller), an element managed by the SDN controller on which to perform a software version maintenance operation, the identified element in a software defined network (SDN), wherein identifying the element comprises:

responsive to the SDN controller determining that the element has powered up, sending a vendor packet from the SDN controller to the element;

receiving a reply to the vendor packet from the element, the reply identifying a version of a software image installed on the element, the reply identifying an element type for the element selected from a list consisting of a network switch, a router, a VPN, a firewall, a hypervisor, an agent, and appliance, and a load balancer;

determining, using the SDN controller, that the version identified in the reply does not match a required version of the software image identified in a catalog maintained by the SDN controller;

ensure, using the SDN controller, that there is an active backup for the element in the SDN;

responsive to ensuring that there is an active backup for the element, de-activate, using the SDN controller, the element;

initiate the software version maintenance operation on the element; and in response to completion of the software version maintenance operation, re-activate, using the SDN controller, the element in the SDN.

11. The computer program product of claim 10, wherein said instructions to send comprise instructions to send the vendor packet in response to the SDN controller becoming active in the SDN.

12. The computer program product of claim 10, wherein said instructions to send comprise instructions to send the vendor packet according to a user-defined schedule accessible to the SDN controller.

13. The computer program product of claim 10, further comprising instructions to: before said reactivating, performing a regression test on the element, wherein the regression test verifies that the software version maintenance operation was successful, and wherein the regression test is specific to the element type of the element.

14. A computer system comprising:

one or more computer processors;

one or more computer readable storage media;

program instructions stored on the computer readable storage media for execution by at least one of the computer processors, the program instructions comprising instructions to:

identify, by a software defined networking controller (SDN controller), an element managed by the SDN controller on which to perform a software version maintenance operation, the identified element in a software defined network (SDN), wherein identifying the element comprises:

responsive to the SDN controller determining that the element has powered up, sending a vendor packet from the SDN controller to the element;

receiving a reply to the vendor packet from the element, the reply identifying a version of a software image installed on the element, the reply identifying an element type for the element selected from a list consisting of a network switch, a router, a VPN, a firewall, a hypervisor, an agent, and appliance, and a load balancer;

determining, using the SDN controller, that the version identified in the reply does not match a required version of the software image identified in a catalog maintained by the SDN controller;

ensure, using the SDN controller, that there is an active backup for the element in the SDN;

responsive to ensuring that there is an active backup for the element, de-activate, using the SDN controller, the element;

initiate the software version maintenance operation on the element; and in response to completion of the software version maintenance operation, re-activate using the SDN controller, the element in the SDN.

15. The computer system of claim 14, wherein said instructions to send comprise instructions to send the vendor packet in response to the SDN controller becoming active in the SDN.

16. The computer system of claim 14, wherein said instructions to send comprise instructions to send the vendor packet according to a user-defined schedule accessible to the SDN controller.

17. The computer system of claim 14, further comprising instructions to: before said reactivating, performing a regression test on the element, wherein the regression test verifies that the software version maintenance operation was successful, and wherein the regression test is specific to the element type of the element.

* * * * *